(12) United States Patent
Egashira et al.

(10) Patent No.: US 7,572,195 B2
(45) Date of Patent: Aug. 11, 2009

(54) GOLF BALL MATERIAL AND GOLF BALL

(75) Inventors: Yoshinori Egashira, Chichibu (JP); Eiji Takehana, Chichibu (JP); Kae Yamazaki, Chichibu (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 0 days.

(21) Appl. No.: 11/812,432

(22) Filed: Jun. 19, 2007

(65) Prior Publication Data

US 2008/0318710 A1 Dec. 25, 2008

(51) Int. Cl.
*A63B 37/00* (2006.01)

(52) U.S. Cl. ...................................... 473/351

(58) Field of Classification Search .................. 473/351
See application file for complete search history.

(56) References Cited

U.S. PATENT DOCUMENTS

| | | | |
|---|---|---|---|
| 4,884,814 A | 12/1989 | Sullivan | |
| 5,120,791 A | 6/1992 | Sullivan | |
| 5,971,871 A | 10/1999 | Sullivan et al. | |
| 6,100,321 A | 8/2000 | Chen | |
| 6,653,382 B1 | 11/2003 | Statz et al. | |
| 6,777,472 B1 | 8/2004 | Statz et al. | |
| 6,815,480 B2 | 11/2004 | Statz et al. | |
| 6,974,854 B2 | 12/2005 | Dewanjee | |
| 7,041,769 B2 | 5/2006 | Wu et al. | |
| 7,090,798 B2 | 8/2006 | Herbert et al. | |
| 2005/0267240 A1 | 12/2005 | Chen | |
| 2006/0030668 A1* | 2/2006 | Egashira et al. | 525/221 |
| 2006/0128504 A1* | 6/2006 | Watanabe et al. | 473/371 |

FOREIGN PATENT DOCUMENTS

JP    2003-512495 A    4/2003

* cited by examiner

*Primary Examiner*—Raeann Trimiew
(74) *Attorney, Agent, or Firm*—Sughrue Mion, PLLC

(57) ABSTRACT

The present invention provides a golf ball material which is a thermoplastic ionomer blend composition of an acid-containing ethylene-based terpolymer having a weight-average molecular weight Mw of at least about 100,000, an acid-containing ethylene-based copolymer and/or terpolymer having a Mw of about 1,500 to about 95,000, and a low-molecular-weight acid-containing compound having a molecular weight of up to about 1,000, at least some portion of which composition is neutralized. The golf ball material is soft and resilient, and has a good durability and improved moldability.

10 Claims, No Drawings

GOLF BALL MATERIAL AND GOLF BALL

BACKGROUND OF THE INVENTION

The present invention relates to a golf ball material containing an ionomer composition made up of, in the molecular-weight distribution, three distinct components. The three-component ionomer composition includes an ethylene-α,β-unsaturated carboxylic acid-α,β-unsaturated carboxylic acid ester terpolymer in which at least some portion of the carboxylic acid functional groups is neutralized.

Ionomeric resins (ionomers) are useful materials, especially in golf balls, among other things. In particular, terpolymer ionomers obtained by neutralizing with metal cations terpolymers of an α-olefin such as ethylene, an unsaturated carboxylic acid such as acrylic acid, methacrylic acid or maleic acid, and an ester (softening monomer) of any of these unsaturated carboxylic acids are useful as materials capable of imparting softness to golf balls.

Golf balls manufactured using ionomer materials generally have improved rebound resilience, toughness, and durability as compared with a balata ball construction, and are thus structurally important materials in golf balls. Ionomers such as Surlyn® available from DuPont and Iotek® available from Exxon-Mobil Chemical have become the materials of choice over traditional balata (trans polyisoprene, natural or synthetic) rubbers. However, ionomers having a high durability generally tend to be very hard. When used as golf ball materials, the resulting balls lack the softness required to impart the spin necessary to control the ball in play and also tend to have a poor feeling on impact.

Yet, there has been a desire among golfers for a golf ball endowed with properties that combine the good impact resistance and distance of hard copolymer ionomers such as ethylene-(meth)acrylic acid copolymers with the soft feeling and spin provided by balata.

Terpolymer ionomers obtained by neutralizing with metal cations a terpolymer composed of an α-olefin such as ethylene, an unsaturated carboxylic acid such as acrylic acid, methacrylic acid or maleic acid, and an ester of such an unsaturated carboxylic acid (softening monomer) can provide softness. However, such terpolymer ionomers are not suitable by themselves as golf ball materials because of a low rebound resilience.

In order to prepare ionomeric materials which provide softness, high rebound resilience, high durability and spin control, as related in a number of published U.S. patent publications (Patent Documents 1 to 3 below), melt blends of hard ionomers and soft ionomers have hitherto been investigated. However, compared with hard copolymer ionomers by themselves, blends which contain also a soft ionomers tend to have a poor scuff resistance when used in golf ball covers. In addition, a number of U.S. patent publications (Patent Documents 4 to 7 below) describe materials obtained by using a high-molecular-weight highly neutralized ionomer together with a low-molecular-weight higher aliphatic acid metal salt so as to improve scuff resistance. However, in contrast with a high-molecular-weight ionomer component used by itself, formulating a low-molecular-weight higher aliphatic acid metal salt gives rise to incompatibility problems. As a result, when such a blend is used in certain layers of a golf ball, the golf ball will have a poor durability. Moreover, a high degree of neutralization gives rise to a decline in the flowability of the material, which adversely affects processability when the golf ball is injection molded.

Also, as illustrated in several U.S. patent publications (Patent Documents 8 to 10 below), polyurethanes have been developed in the past as golf ball materials. Polyurethanes, particularly when used in golf ball covers, are materials which provide a combination of a good scuff resistance, spin control and a soft feeling on impact. However, because polyurethanes have a low rebound resilience, they reduce the performance of the golf ball. Moreover, thermoset polyurethanes are more difficult to process than thermoplastic ionomers and cannot be recycled, increasing the material costs.

Patent Document 1: U.S. Pat. No. 4,884,814
Patent Document 2: U.S. Pat. No. 5,120,791
Patent Document 3: U.S. Pat. No. 5,971,871
Patent Document 4: U.S. Pat. No. 6,100,321
Patent Document 5: U.S. Pat. No. 6,653,382
Patent Document 6: U.S. Pat. No. 6,777,472
Patent Document 7: U.S. Pat. No. 6,815,480
Patent Document 8: U.S. Pat. No. 6,974,854
Patent Document 9: U.S. Pat. No. 7,041,769
Patent Document 10: U.S. Pat. No. 7,090,798
Patent Document 11: JP-A 2003-512495

SUMMARY OF THE INVENTION

It is therefore an object of the present invention to provide a golf ball material having a good softness (soft feeling on impact), durability, rebound resilience and moldability obtained by blending a high-molecular-weight ionomer-based component and a low-molecular-weight carboxylic acid with a third component formulated and neutralizing to a high degree so as to form a more uniformly dispersed blend composition when compared with the highly neutralized composition formed from the former two components except the third one. A further object of the invention is providing golf balls which include as a ball component a molding (part) made from such a golf ball material.

The inventors have discovered that by blending together, based on the polystyrene equivalent weight-average molecular weight Mw in gel permeation chromatography (GPC), a high-molecular-weight ionomer-based component (a), a low-molecular-weight carboxylic acid component (c) and an ionomer-based component (b) having an intermediate molecular weight between components (a) and (c), and neutralizing the blended components to a high degree of neutralization, the compatibility between the high-molecular-weight ionomeric component (a) and the low-molecular-weight carboxylic acid metal salt component (c) is improved, thus enabling a golf ball material having a high melt flow rate (MFR) and a good durability to be achieved. The inventors have also found both that, surprisingly, such a material has a good thermal stability, flow properties and processability, making it suitable for injection molding, and moreover that it is ideal for forming golf balls endowed with excellent durability, scuff resistance, optimal hardness and other properties without any loss of the rebound resilience of moldings obtained from the material.

The inventors have also discovered that golf balls constructed using a molding of such a golf ball material as a ball component ("ball component" refers here and below to the cover material or intermediate layer material in a two-piece solid golf ball composed of a core and a cover encasing the core, or in a multi-piece solid golf ball composed of a core of at least one layer, at least one intermediate layer encasing the core, and a cover of at least one layer encasing the intermediate layer) are endowed with an excellent durability, scuff resistance, optimal hardness and other properties without any loss of the rebound resilience.

Accordingly, the invention provides the following golf ball materials and golf balls.

[1] A golf ball material which includes a thermoplastic ionomer blend composition that at least three thermoplastic components (a), (b) and (c) below are melt-blended, followed by neutralizing the blend composition with (d) metal cations:

(a) at least one E/X/Y terpolymer having a polystyrene equivalent weight-average molecular weight Mw at least about 100,000, measured by gel permeation chromatography (GPC), wherein E is an α-olefin, X is a $C_3$ to $C_8$ unsaturated monocarboxylic acid or unsaturated dicarboxylic acid (or an acid anhydride thereof) and Y is an alkyl ester of an unsaturated monocarboxylic acid or unsaturated dicarboxylic acid in which the alkyl groups have from 1 to 8 carbon atoms, and wherein X is present in an amount of from about 1 to about 30 wt % of the terpolymer and Y is present in an amount of from about 2 to about 30 wt % of said terpolymer;

(b) at least one E/X copolymer and/or E/X/Y terpolymer having a polystyrene equivalent weight-average molecular weight Mw about 1,500 to about 95,000, wherein X is present in an amount of from about 1 to about 30 wt % of the E/X copolymer or E/X/Y terpolymer and Y is present in an amount of from about 2 to about 30 wt % of the E/X/Y terpolymer, component (b) being present in an amount of from about 5 to about 45 wt % based on the total weight of components (a), (b) and (c) combined; and (c) at least one mono- and/or multifunctional acid groups-containing organic compound, or a metal salt thereof, having a molecular weight of less than about 1,000, component (c) being present in an amount of about 5 to about 35 wt % based on the total weight of components (a), (b) and (c) combined.

[2] The golf ball material of [1] above, wherein component (d) is an oxygen-containing inorganic metal compound selected from the group consisting of metal oxides, metal carbonates and metal hydroxides, in which the metal cations neutralize at least some portion of the acid groups present in the thermoplastic component composition of (a), (b) and (c).

[3] The golf ball material of [1], wherein the metal cations in component (d) are of a type selected from among groups IA, IB, IIA, IIB, IIIA, IIIB, IVA, IVB, VA, VB, VIIA, VIIB, VIIB and VIIIB of the periodic table.

[4] The golf ball material of [1], wherein the thermoplastic ionomer blend composition has a melt flow rate (MFR) of at least 2.0 g/10 min.

[5] The golf ball material of [1], wherein component (a) is a partially neutralized terpolymer.

[6] A golf ball which includes a molding made of the golf ball material according to any item of [1] to [5].

[7] A golf ball selected from among two-piece solid golf balls having a core and a cover encasing the core and multi-piece solid golf balls having a core of at least one layer, at least one intermediate layer encasing the core, and a cover of at least one layer encasing the intermediate layers, wherein the cover or intermediate is made of the golf ball material of any item of [1] to [5].

DETAILED DESCRIPTION OF THE INVENTION

The invention is described more fully below.

The invention provides an ionomeric composition that includes at least the three thermoplastic components (a), (b) and (c) described below which are neutralized with metal cations. Component (a) is at least one E/X/Y terpolymer having a polystyrene equivalent weight-average molecular weight Mw at least about 100,000, determined by gel permeation chromatography (GPC), wherein E is an α-olefin, X is a $C_3$ to $C_8$ unsaturated carboxylic acid or unsaturated dicarboxylic acid (or an acid anhydride thereof) and Y is an alkyl ester of an unsaturated carboxylic acid or unsaturated dicarboxylic acid in which the alkyl groups have from 1 to 8 carbon atoms, and wherein X is present in an amount of from about 1 to about 30 wt % of the E/X/Y terpolymer and Y is present in an amount of from about 2 to about 30 wt % of the E/X/Y terpolymer.

It should be noted with regard to GPC weight-average molecular weight measurement that, since the molecules of the E/X/Y terpolymer and the E/X copolymer are adsorbed as they are by the GPC column due to the X acid groups in the molecules, GPC measurement in this state is not possible. It is usual to carry out GPC measurement after converting of the X acid groups to esters, then calculate the polystyrene equivalent weight-average molecular weight Mw. Esterification is carried out in general accordance with the method described in *J. Applied Polymer Science* 29(4), 585 (1991).

Component (b) in the invention is at least one E/X copolymer and/or E/X/Y terpolymer having a weight-average molecular weight Mw of from about 1,500 to about 95,000, wherein X is present in an amount of from about 1 to about 30 wt % of the E/X copolymer or E/X/Y terpolymer, and Y is present in an amount of from about 2 to about 30 wt % of the E/X copolymer or E/X/Y terpolymer. Component (b) is present in an amount of from about 5 to about 45 wt % based on the total weight of components (a), (b) and (c) combined.

Component (c) in the invention is at least one mono- and/or multifunctional acid groups-containing organic compound, or a metal salt thereof. Component (c) imparts a plasticizing effect to the thermoplastic ionomer blend composition of the invention, and has a molecular weight of less than about 1,000. Moreover, Component (c) is present in an amount of about 5 to about 35 wt % based on the total weight of components (a), (b) and (c) combined.

Component (d) of the invention is a metal cation source which is composed of an oxygen-containing inorganic metal compound selected from among metal oxides, metal carbonates and metal hydroxides, neutralizing at least some portion of the acid groups present in the thermoplastic component composition of above components (a), (b) and (c) to give a thermoplastic ionomer blend composition. The metal cations in component (d) are of a type selected from among groups IA, IB, IIA, IIB, IIIA, IIIB, IVA, IVB, VA, VB, VIIA, VIIB, VIIB and VIIIB of the periodic table.

Compared with the neutralization product of a two-component blend of above thermoplastic components (a) and (c), the thermoplastic ionomer blend composition obtained by neutralizing acid groups in the three-component composition of above thermoplastic components (a), (b) and (c) has a melt flow rate (abbreviated below as "MFR") which is preferably at least 2.0 g/10 min. As a result, the composition has an excellent processability and golf balls obtained using this material can be imparted with an excellent durability in terms of the COR shot number.

Illustrative examples of olefins that are used as E in the above-described terpolymer E/X/Y of thermoplastic component (a) include ethylene, propylene, butene, pentene, hexene, heptene and octene. The use of ethylene is especially preferred.

Illustrative examples of unsaturated monocarboxylic acids that are used as X include acrylic acid and methacrylic acid. The use of acrylic acid or methacrylic acid is especially preferred. Illustrative examples of unsaturated dicarboxylic acids that are used as X include maleic acid, fumaric acid and itaconic acid, and illustrative examples of unsaturated carboxylic acid anhydrides that are used as X include maleic anhydride and itaconic anhydride. The use of maleic acid and maleic anhydride is especially preferred.

Unsaturated carboxylic acid esters which are used as Y include lower alkyl esters of the above unsaturated carboxylic acids. Specific examples include methyl methacrylate, ethyl methacrylate, propyl methacrylate, butyl methacrylate, methyl acrylate, ethyl acrylate, propyl acrylate and butyl acrylate. The use of butyl acrylate (n-butyl acrylate, isobutyl acrylate) is especially preferred. Unsaturated dicarboxylic acid half esters that are used as Y include monoesters of the above-mentioned dicarboxylic acids, such as monoethyl maleate, monomethyl fumarate and monoethyl itaconate. The use of monoethyl maleate is especially preferred.

Illustrative examples of olefin-unsaturated carboxylic acid-unsaturated carboxylic acid ester polymers include Nucrel AN4318, Nucrel 9-1 and Bynel 2022 (all products of DuPont), and ESCOR ATX325 and ESCOR ATX320 (both products of Exxon-Mobil Chemical).

The X and other constituent monomers in the copolymer E/X and/or the terpolymer E/X/Y in the above-described thermoplastic component (b) are the same as those mentioned above in connection with thermoplastic component (a). However, thermoplastic component (b) has a weight-average molecular weight Mw in a range of from about 1,500 to about 95,000. Illustrative examples include Nurel 599 (Mw 84,000; available from DuPont), Primacor 59901 (Mw 60,000; available from Dow Chemical), AC580 (Mw 26,000; available from Allied Signal), and AC5120 (Mw 5,200; available from Allied Signal).

Component (c) is at least one monoacid and/or multifunctional acid groups-containing organic compound having a molecular weight of less than about 1,000, or a metal salt thereof. The acid groups are selected from among sulfonic acid groups, carboxylic acid groups and phosphoric acid groups. The acid group-containing compound is exemplified by alkyl, cycloalkyl, aryl, allyl, alkylaryl and aralkyl derivatives thereof having fewer than about 65 carbons.

Illustrative, non-limiting, examples include laurylsulfonic acid, dodecylbenzenesulfonic acid, polyoxyethylene alkyl ether sulfonic acid, 12-hydroxyoleic acid (ricinoleic acid), 12-hydroxystearic acid, oleic acid, stearic acid, arachidic acid, behenic acid lignoceric acid, adipic acid, sebacic acid, tetrapropenylsuccinic acid (including the acid anhydride), hexadodecenylsuccinic acid (including the acid anhydride), eicosenylsuccinic acid (including the acid anhydride), nitrilotriacetic acid, diethylenetriaminepentaacetic acid, triethylenetetraminehexaacetic acid, 1,3-propanediaminetetraacetic acid, glycol ether diamine tetraacetic acid, dicarboxymethylglutamic acid, nitrilotris(methylenephosphoric acid), phosphonobutane tricarboxylic acid, γ-resorcylic acid, o-pyrocatechuic acid, gentisic acid, protocatechuic acid, orsellinic acid, homogentisic acid, homoprotocatechuic acid, hydrocaffeic acid, caffeic acid, trimellitic acid and hemimellitic acid. These are used in the form of metal salts thereof, such as lithium, sodium, zinc, magnesium, calcium or potassium salts.

When above component (c) is a metal salt, or when it becomes a metal salt following neutralization by component (d), metal cations of the metal salt are occasionally used to neutralize carboxylic acids in the terpolymer component (a) and the component (b), depending on how strong the basicity of the acid residue of the metal salt is; that is, the migration of the metal cations occurs, making it necessary to take into account the behavior of free acid residues from the metal salt. For example, when magnesium palmitate or magnesium stearate is used as the metal salt of component (c), a portion of this salt is consumed in the acid-neutralizing reaction on non-neutralized carboxylic acids in terpolymer component (a) and the component (b). At the same time, the free acid residues in the form of palmitic acid (boiling point, 215° C. at 15 mmHg) or stearic acid (vaporizes at 100° C.) are discharged outside the reaction system at a high temperature of the reaction carried out under vacuum venting. As a result, the terpolymer-neutralizing reaction proceeds, which makes the MFR of the thermoplastic ionomer blend composition obtained more difficult to control. In such a case, it is preferable to remove the acid residues from the system; if the acid residues remain within the reaction system, this causes an adverse effect on the physical properties of the resulting thermoplastic ionomer blend composition. If the acid residue is an olefinic higher aliphatic acid such as oleic acid or linoleic acid, a putrid acid odor due to air oxidation arises, leading to environmental contamination (foul odor). On the other hand, metal salts of sulfonic acid groups, dicarboxylic acid groups and multifunctional acid groups are stable, and substantially no migration of the metal cations of such salts to the carboxylic acids in the terpolymer component (a) and the component (b) occurs.

The metal cation source (d) composed of an oxygen-containing inorganic metal compound which is a metal oxide, a metal carbonate or a metal hydroxide is selected from among groups IA, IB, IIA, IIB, IIIA, IIIB, IVA, IVB, VA, VB, VIIA, VIIB, VIIB and VIIIB of the periodic table. Illustrative, non-limiting examples of the oxygen-containing inorganic compound include lithium carbonate, sodium carbonate, potassium carbonate, magnesium carbonate, calcium carbonate, magnesium oxide, zinc oxide, calcium oxide and magnesium hydroxide, at least one or more thereof are used.

The oxygen-containing inorganic compound (d) is used in the form of ultrafine particles (average particle size, 0.005 to 0.5 μm; particle size distribution, 0.001 to 1.0 μm) or in a masterbatched (concentrated) form. Ultrafine particles are well-suited for the acid-neutralizing reaction of the invention because, compared with ordinary particles having a particle size on the order of several tens of microns, they have an active surface, a high reactivity to acid and a good dispersibility. It is advantageous for the oxygen-containing inorganic metal compound used in such masterbatching (concentrating) to have an average particle size of from 0.005 to 50 μm and a particle size distribution of from 0.001 to 300 μm. Although these particles do not necessarily have to be as finely ground as the above-described ultrafine particles of an oxygen-containing inorganic compound. If the average particle size is too large, the acid-neutralizing reaction does not go to completion. On the other hand, if the average particle size is too small, the particle dispersion during masterbatch (concentrate) preparation becomes poor. As used herein, "average particle size" and "particle size distribution" refer to values obtained by particle size distribution measurement using a laser diffraction technique (laser diffraction/scattering).

It is advantageous for the base polymer used for masterbatching the above oxygen-containing inorganic metal compound (d) to be a polymer having a high melt flow rate. Exemplary base polymers include high-MFR ethylene waxes and low-acid content and high-MFR ethylene copolymers such as Nucrel 699 (available from DuPont; methacrylic acid content, 11 wt %; MFR, 100 g/10 min) and Nucrel N0200H (available from DuPont; methacrylic acid content, 2 wt %; MFR, 130 g/10 min). The weight percent (concentration) of the oxygen-containing inorganic metal compound in the masterbatch is preferably from 20 to 80 wt %, and more preferably from 30 to 70 wt %. If the weight percent (concentration) of the oxygen-containing inorganic metal compound in the masterbatch is excessive, the masterbatch has an unacceptably low melt flow rate (MFR<0.1 g/10 min). In such a case, when the masterbatch is mixed with the above-described thermoplastic component composition of (a), (b) and (c), the oxygen-containing inorganic metal compound in the masterbatch can not disperse well. On the other hand, if the concentration is low, the amount of the masterbatch added becomes larger, as a result of which the high-MFR thermoplastic resins (e.g., ethylene waxes, low-acid and high-MFR ethylene copolymers) used in the masterbatch have adverse effects, possibly lowering the physical properties of the golf ball material.

The amount of the oxygen-containing inorganic metal compound (d) used as the metal cation source should be set so that the MFR of the thermoplastic ionomer blend composition obtained from the above-described acid-neutralizing reaction is at least 2.0 g/10 min. If excess component (d) is added, an excessive degree of neutralization results, lowering the melt flow rate of the golf ball material and adversely affecting its processability. Also, weld lines tend to form on the moldings, which tends to raise cracking. On the other hand, excessively little component (d) diminishes the physical properties of the golf ball material and results in a poor rebound resilience and durability in golf balls obtained therefrom.

Methods for preparing the thermoplastic ionomer blend composition of the invention are of two broad types.

In one type of the methods, first the carboxylic acids in the terpolymer serving as component (a) are neutralized to a certain degree of neutralization; that is, a terpolymer ionomer is used, components (b), (c) and (d) are added, and the acid-neutralizing reaction is carried out. In another type, a non-neutralized terpolymer is used as component (a), components (b), (c) and (d) are added, and the acid-neutralizing reaction is carried out. To achieve an efficient acid-neutralizing reaction on the terpolymer, it is preferable to use the former method. In either of these methods, it is possible to melt-blend components (a), (b) and (c), then add component (d) and carry out the acid-neutralizing reaction. However, this case increases running costs.

In the former method, when a terpolymer ionomer is prepared beforehand, its degree of neutralization should be set so as to keep the hot-melt flowability of the terpolymer ionomer obtained to a considerable extent while taking into account the melt-blending of the other components (b), (c) and (d). Generally, it is preferable to set the degree of neutralization for the terpolymer (acid content, 4 to 15 wt %; (meth)acrylate content, 10 to 25 wt %; MFR, 30 to 100 g/10 min) to 60 mol % or below.

The acid-neutralizing reaction of the thermoplastic component composition of (a), (b) and (c) with the metal cation source which is an oxygen-containing inorganic metal compound (component (d)) is preferably carried out using a vacuum vented twin-screw extruder having a screw segment configuration with a kneading disc zone.

The following thermoplastic resins can be incorporated into the thermoplastic ionomer blend composition of the invention. Illustrative, non-limiting, examples of thermoplastic resins include polyolefin elastomers (including polyolefins and metallocene polyolefins), polystyrene elastomers, diene polymers, polyacrylate polymers, polyamide elastomers, polyurethane elastomers, polyester elastomers and polyacetals.

The golf ball material of the invention additionally includes optional additives as appropriate for the intended use. When the inventive golf ball material is used as a cover material, various additives such as pigments, dispersants, antioxidants, ultraviolet absorbers and light stabilizers can be added to above components (a) to (c). When such additives are included, they are added in an amount of generally at least 0.1 part by weight, and preferably at least 0.5 part by weight, but generally not more than 10 parts by weight, and preferably not more than 4 parts by weight, per 100 parts by weight of above components (a) to (c) combined.

The golf ball material of the invention has a specific gravity of generally at least 0.9, preferably at least 0.92, and more preferably at least 0.94, but generally not more than 1.3, preferably not more than 1.2, and more preferably not more than 1.05.

Moldings obtained using the golf ball material of the invention have a Shore D hardness of preferably at least 40, and more preferably at least 45, but preferably not more than 75, and more preferably not more than 70. If the Shore D hardness is too high, the golf ball that has been formed has a far inferior feeling on impact. On the other hand, if the Shore D hardness is too low, the rebound resilience decreases.

The golf ball material (i.e., thermoplastic ionomer blend composition) of the invention is used as a cover material in a two-piece solid golf ball composed of a core and a cover encasing the core, or as a cover material or intermediate layer material in a multi-piece solid golf ball composed of a core of at least one layer, at least one intermediate layer encasing the core, and a cover of at least one layer encasing the intermediate layer.

As described above, the inventive golf ball material is obtained by blending together a high-molecular-weight ionomer-based component and a low-molecular-weight carboxylic acid with a third component that makes the component (blend) composition more uniform and by neutralizing the component composition to form a highly neutralized blend composition. A more uniformly dispersed blend composition can be obtained in this way. The golf ball material of the invention has an excellent softness (soft feel on impact), durability, rebound resilience and processability, and is thus highly useful as a material for golf ball components such as the core and one or more cover layer.

EXAMPLES

Examples of the invention and Comparative Examples are given below by way of illustration and not by way of limitation. The twin-screw extruder used for the acid-neutralizing reactions in the examples had a screw diameter of 32 mm, an overall L/D ratio of 41 and a percentage ratio of the kneading disc zone L/D to the overall L/D of 40%, and was equipped with a vacuum-venting port and a water-injecting device.

Example 1

A three-component system composed of Terpolymer 2 as component (a), Polymer 2 as component (b) and Ingredient 1 as component (c) was dry-blended with a magnesium hydroxide masterbatch (MgMB) as component (d) in the proportions shown in Table 1, fed to a twin-screw extruder hopper set to 210° C., then subjected to an acid-neutralizing reaction while being extruded under vacuum venting, thereby obtaining a uniform Ionomer Blend Composition 1. The screw revolution was 125 rpm and the extrusion rate (output) was 5.5 kg/hr. The MFR, hardness and tensile properties of the ionomer blend composition obtained are shown in Table 1. Using this three-component Ionomer Blend Composition 1 as the intermediate layer in a three-piece golf ball, using a polybutadiene rubber crosslinked body (diameter, 37.3 mm; weight, 32.8 g; compressive deformation, 4.10 mm) formulated as shown below as the core material, and using an injection-molding machine (setting temperatures: hopper, 160° C.; C1 to die head, 180 to 210° C.), injection molding was carried out at an injection pressure of 5.9 MPa, a holding pressure of 4.9 MPa, an injection and holding time of 8 seconds and a cooling time of 25 seconds, thereby producing an intermediate layer having a thickness of 1.35 mm. The balls obtained were left to stand for one day, following which an ionomer blend resin (Surlyn 8940/Surlyn 9910/TiO$_2$=50/50/1 by weight) was similarly injection-molded as the cover layer, thereby creating three-piece golf balls (diameter, about 42.7 mm; weight, about 45.5 g). These golf balls were evaluated. The results are shown in Table 1.

Core Formulation:

| | |
|---|---|
| 1,4-cis-Polybutadiene rubber | 100 parts by weight |
| Zinc acrylate | 21 parts by weight |
| Zinc oxide | 5 parts by weight |
| Barium sulfate | 26 parts by weight |
| Dicumyl peroxide | 0.8 part by weight |

A two-component ionomer blend composition of components (a) and (c) was used as Comparative Example 1. Compared to this comparative example, the three-component ionomer blend composition of components (a), (b) and (c) in Example 1 had the proper degree of hardness, was easier to injection-mold, and exhibited a higher MFR. Moreover, in the properties of the golf balls obtained in the example of the invention, there was no loss in initial velocity or rebound resilience, in addition to which the durability was excellent.

A metal oxide masterbatch was prepared according to the method described in Japanese Patent Application No. 2005-227691. That is, a 5-liter pressure kneader (manufactured by Naniwa Machinery Manufacturing Co., Ltd.; setting temperature, 100° C.) was charged with a combined amount of 2.0 kg of Nucrel N0200H (an ethylene-methacrylic acid-isobutyl acrylate terpolymer produced by DuPont) as the base polymer for the masterbatch and magnesium hydroxide Mg(OH)$_2$ (average particle size, 0.8 μm; produced by Kyowa Chemical Industry) in a weight ratio (Nucrel N0200H/Mg (OH)$_2$) of 50/50, and mixing was carried out for 20 minutes under an applied pressure of 0.49 MPa at a rotor revolution of 35 rpm and at a mixing temperature controlled within a range of 120 to 130° C. The mixture was discharged as a strand from a 40 mm diameter twin-screw/single-screw extruder (Naniwa Machinery Manufacturing Co., Ltd.; setting temperature, 180° C.), passed through a cooling water bath and an air knife, then pelletized. The melt flow rate of the Mg(OH)$_2$-containing masterbatch obtained having a 50 wt % Mg(OH)$_2$ content was 2.3 g/10 min (measured at 190° C. under a load of 2,160 g). This masterbatch is designated below as "MgMB."

Example 2

In Example 2 shown in Table 1, aside from using Ingredient 1 and Ingredient 4 as component (c), the same procedures as in Example 1 were carried out using the proportions indicated for Example 2, thereby giving a three-component Ionomer Blend Composition 2 of components (a), (b) and (c) (component (c) being of two types). Golf balls were manufactured using this material to form the intermediate layer.

A two-component ionomer blend composition of (a) and (c) (where component (c) is of two types) was used as Comparative Example 2. In comparison with Comparative Example 2, the three-component Ionomer Blend Composition 2 of Example 2 had a high melt flow rate and injection molding was easy. In addition, golf balls obtained therefrom had an excellent durability without any loss of initial velocity or rebound resilience.

Example 3

In Example 3 shown in Table 1, aside from using Ingredient 2 as component (c), the same procedures as in Example 1 were carried out using the proportions indicated for Example 3, thereby giving a three-component Ionomer Blend Composition 3 of components (a), (b) and (c). Golf balls were manufacturing using this material to form the intermediate layer.

A two-component ionomer blend composition of (a) and (c) was used as Comparative Example 3. In comparison with Comparative Example 3, the (a)+(b)+(c) three-component Ionomer Blend Composition 3 of Example 3 had a high melt flow rate and injection molding was easy. The golf balls obtained therefrom had an excellent durability without any loss of initial velocity or rebound resilience.

Example 4

In Example 4 shown in Table 1, aside from using Polymer 1 and Polymer 2 as component (b) and Ingredient 2 and Ingredient 4 as component (c), the same procedures as in Example 1 were carried out using the proportions indicated for Example 4, thereby giving a three-component Ionomer Blend Composition 4 of components (a), (b) and (c) (components (b) and (c) each being of two types). Golf balls were manufactured using this material to form the intermediate layer.

A two-component ionomer blend composition of (a) and (c) was used as Comparative Example 3. In comparison with Comparative Example 3, the (a)+(b)+(c) three-component Ionomer Blend Composition 4 of Example 4 had a high melt flow rate and injection molding was easy. The golf balls obtained therefrom had an excellent durability without any loss of initial velocity or rebound resilience.

Example 5

In Example 5 shown in Table 1, aside from using Terpolymer 1 in which 50 mol % of the acid content in Terpolymer 2 is neutralized as component (a), Polymer 1 and Polymer 2 as component (b) and Ingredient 1, Ingredient 3 and Ingredient 4 as component (c), the same procedures as in Example 1 were carried out using the proportions indicated for Example 5, thereby giving a three-component Ionomer Blend Composition 5 of components (a), (b) and (c) (component (b) being of two types, and component (c) being of three types). Golf balls were manufactured using this material to form the intermediate layer.

Compared with the (a)+(c) two-component ionomer blend composition of Comparative Example 2, the (a)+(b)+(c) three-component Ionomer Blend Composition 5 of Example 5 had a high melt flow rate and injection molding was easy. The golf balls obtained therefrom had an excellent durability without any loss of initial velocity or rebound resilience.

Also, in Example 5, by using a terpolymer ionomer which is already neutralized to a certain degree of neutralization, the amount of the cation source used as component (d) can be reduced. This has the advantage that the neutralization reaction proceeds more readily than in cases where a non-neutralized terpolymer is used.

Comparative Example 1

Comparative Example 1 was carried out as a control for Example 1. Aside from using Terpolymer 2 as component (a) and Ingredient 1 as component (c), the same procedures as in Example 1 were carried out, thereby giving an (a)+(c) two-component ionomer blend composition. Three-piece golf balls were manufactured using this material to form the intermediate layer.

Compared with the material obtained in Example 1, this (a)+(c) two-component ionomer blend composition, due to the absence of component (b), had a low melt flow rate (below 1.0 g/10 min) and a poor processability. In addition, golf balls obtained therefrom had a poor durability. The initial velocity and the COR rebound resilience were comparable to those of the golf balls obtained in Example 1.

Comparative Example 2

Comparative Example 2 was carried out as a control for Examples 2 and 5. Aside from using Terpolymer 2 as component (a) and using both Ingredient 1 and Ingredient 4 as component (c), the same procedures as in Example 1 were carried out, thereby giving a (a)+(c) two-component ionomer blend composition (in which component (c) is of two types). Three-piece golf balls were manufactured using this material to form the intermediate layer.

Compared with the material obtained in Example 2, this (a)+(c) two-component ionomer blend composition, due to the absence of component (b), had a low melt flow rate (below 1.0 g/10 min) and a poor processability. In addition, golf balls obtained therefrom had a poor durability. The initial velocity and the COR rebound resilience were comparable to those of the golf balls obtained in Example 2.

Comparative Example 3

Comparative Example 3 was carried out as a control for Examples 3 and 4. Aside from using Terpolymer 2 as component (a) and using Ingredient 2 as component (c), the same procedures as in Example 1 were carried out, thereby giving a (a)+(c) two-component ionomer blend composition. Three-piece golf balls were manufactured using this material to form the intermediate layer.

Compared with the materials obtained in Examples 3 and 4, this (a)+(c) two-component ionomer blend composition, due to the absence of component (b), had a low melt flow rate (below 1.0 g/10 min) and a poor processability. In addition, golf balls obtained therefrom had a poor durability. The initial velocity and the COR rebound resilience were comparable to those of the golf balls obtained in Example 3.

Test results for Examples 1 to 5 and Comparative Examples 1 to 3 are presented in the following table.

TABLE 1

| Items | Example | | | | | Comparative Example | | |
|---|---|---|---|---|---|---|---|---|
| | 1 | 2 | 3 | 4 | 5 | 1 | 2 | 3 |
| Component (a) | | | | | | | | |
| Terpolymer 1 | — | — | — | — | 50 | — | — | — |
| Terpolymer 2 | 56 | 50 | 68 | 64 | — | 70 | 66 | 75 |
| Component (b) | | | | | | | | |
| Polymer 1 | — | — | — | 5 | 5 | — | — | — |
| Polymer 2 | 20 | 18 | 10 | 5 | 13 | — | — | — |
| Component (c) | | | | | | | | |
| Ingredient 1 | 24 | 22 | — | — | 12 | 30 | 29 | — |
| Ingredient 2 | — | — | 22 | 21 | — | — | — | 25 |
| Ingredient 3 | — | — | — | — | 10 | — | — | — |
| Ingredient 4 | — | 10 | — | 5 | 10 | — | 5 | — |
| Component (d) | | | | | | | | |
| MgMB | 3.63 | 3.24 | 4.41 | 4.15 | 1.62 | 4.54 | 4.29 | 4.86 |
| Specific gravity (g/cm$^3$) | 0.950 | 0.984 | 0.957 | 0.974 | 0.984 | 0.960 | 0.977 | 0.960 |
| MFR (g/10 min) | 4.9 | 4.2 | 2.2 | 2.1 | 4.1 | 0.9 | 0.7 | 1.0 |
| Hardness (Shore D) | 50 | 52 | 45 | 45 | 53 | 48 | 50 | 47 |
| Ultimate tensile strength (MPa) | 19.0 | 16.0 | 14.1 | 12.5 | 17.1 | 18.6 | 16.0 | 12.4 |
| Ultimate tensile elongation (%) | 367 | 324 | 322 | 292 | 313 | 403 | 344 | 371 |
| Golf ball diameter (mm) | 42.7 | 42.7 | 42.7 | 42.6 | 42.7 | 42.7 | 42.7 | 42.7 |
| Golf ball weight (g) | 45.39 | 45.59 | 45.49 | 45.56 | 45.58 | 45.46 | 45.56 | 45.46 |
| Deflection at 23° C. (mm) | 3.27 | 3.28 | 3.06 | 3.12 | 3.27 | 3.35 | 3.34 | 3.12 |
| Initial velocity (m/s) | 77.04 | 76.94 | 76.95 | 76.92 | 77.01 | 77.01 | 77.04 | 77.02 |
| Average COR | 0.785 | 0.786 | 0.786 | 0.777 | 0.787 | 0.788 | 0.788 | 0.777 |
| Shot number (durability) | 138 | 131 | 271 | 268 | 134 | 110 | 97 | 235 |

The ingredients cited in the above table are described below.

(i) Terpolymer 1

Obtained by neutralizing 50 mol % of the acid groups in Terpolymer 2 with magnesium ions.

(ii) Terpolymer 2

Ethylene-acrylic acid-n-butyl acrylate terpolymer (MFR, 60 g/10 min; Mw, about 160,000), produced by DuPont.

(iii) Polymer 1

Ethylene-methacrylic acid copolymer (Mw, about 5,000), produced by Allied Signal.

(iv) Polymer 2

Ethylene-methacrylic acid copolymer (MFR, 450 g/10 min; Mw, about 85,000), produced by DuPont.

(v) Ingredient 1

Magnesium stearate, produced by Sakai Chemical Industry.

(vi) Ingredient 2

Magnesium oleate, produced by Mitsuwa Chemicals.

(vii) Ingredient 3

Magnesium hexadecenylsuccinate, produced by Dixie Chemical.

(viii) Ingredient 4

Ethylenediaminetetraacetic acid magnesium disodium, produced by Chelest Corporation.

(ix) MQMB

Magnesium hydroxide/ethylene-methacrylic acid-isobutyl acrylate terpolymer=50/50 by weight The methods used to measure the physical properties of the golf ball materials and the golf balls are described below.

MFR (g/10 min)

The melt flow rate was measured in accordance with JIS-K7210 at a test temperature of 190° C. and a test load of 21.18 N (2.16 kgf).

Shore D Hardness

The Shore D hardness was measured in accordance with ASTM D-2240.

Ultimate Tensile Elongation (%), Ultimate Tensile Strength (MPa)

Measured in accordance with JIS-K7161.

Deflection (mm)

The golf ball was placed on a steel plate, and the deflection (mm) by the ball when compressed under a final load of 1,275 N (130 kgf) from an initial load of 98 N (10 kgf) was measured. This test was carried out at 23±1° C.

Initial Velocity

The initial velocity was measured using an initial velocity measuring apparatus of the same type as the USGA drum rotation-type initial velocity instrument approved by the R&A. The ball was temperature-conditioned for 3 hours at 23±1° C., then tested at the same temperature by being hit with a 250-pound (113.4 kg) head (striking mass) at an impact velocity of 143.8 ft/s (43.83 m/s). Ten balls were hit twice each. The time taken to traverse a distance of 6.28 ft (1.91 m) was measured and used to compute the initial velocity of the ball. This cycle was carried out over a period of about 15 minutes.

Coefficient of Restitution (COR)

The ball was fired from an air cannon against a steel plate at a velocity of 43 m/s, and the velocity at which the ball rebounded from the plate was measured. The coefficient of restitution (COR) is the ratio of the return velocity to the initial velocity of the ball.

Shot Number (Durability)

The durability of the golf ball was evaluated using an ADC Ball COR Durability Tester produced by Automated Design Corporation (U.S.A.). A ball was fired using air pressure and made to repeatedly strike two steel plates arranged in parallel. The average number of shots required for the ball to crack was treated as its durability. These average values were obtained by setting four balls of the same type for testing, repeatedly firing each of the four balls until it cracked, and averaging the number of shots required for each ball to crack. The type of tester used was a horizontal COR durability tester, and the incident velocity of the balls on the steel plates was 43 m/s.

The invention claimed is:

1. A golf ball material comprising a thermoplastic ionomer blend composition of thermoplastic components (a), (b) and (c) below neutralized with (d) metal cations:
   (a) at least one E/X/Y terpolymer having a polystyrene equivalent weight-average molecular weight Mw at least about 100,000, measured by gel permeation chromatography (GPC), wherein E is an α-olefin, X is a $C_3$ to $C_8$ unsaturated monocarboxylic acid or unsaturated dicarboxylic acid (or an acid anhydride thereof) and Y is an alkyl ester of an unsaturated monocarboxylic acid or unsaturated dicarboxylic acid in which the alkyl groups have from 1 to 8 carbon atoms, and wherein X is present in an amount of from about 1 to about 30 wt % of the terpolymer and Y is present in an amount of from about 2 to about 30 wt % of said terpolymer;
   (b) at least one E/X copolymer and/or E/X/Y terpolymer having a polystyrene equivalent weight-average molecular weight Mw about 1,500 to about 95,000 measured by GPC, wherein X is present in an amount of from about 1 to about 30 wt % of the E/X copolymer or E/X/Y terpolymer and Y is present in an amount of from about 2 to about 30 wt % of the E/X/Y terpolymer, component (b) being present in an amount of from about 5 to about 45 wt % based on the total weight of components (a), (b) and (c) combined; and
   (c) at least one mono- and/or multifunctional acid groups-containing organic compound, or a metal salt thereof, having a molecular weight of less than about 1,000, component (c) being present in an amount of about 5 to about 35 wt % based on the total weight of components (a), (b) and (c) combined.

2. The golf ball material of claim 1, wherein component (d) is an oxygen-containing inorganic metal compound selected from the group consisting of metal oxides, metal carbonates and metal hydroxides, in which the metal cations neutralize at least some portion of the acid groups present in the thermoplastic component composition of (a), (b) and (c).

3. The golf ball material of claim 1, wherein the metal cations in component (d) are of a type selected from among groups IA, IB, IIA, IIB, IIIA, IIIB, IVA, IVB, VA, VB, VIA, VIB, VIIB and VIIIB of the periodic table.

4. The golf ball material of claim 1, wherein the thermoplastic ionomer blend composition has a melt flow rate (MFR) of at least 2.0 g/10 min.

5. The golf ball material of claim 1, wherein component (a) is a partially neutralized terpolymer.

6. The golf ball material of claim 1, wherein an oxygen-containing inorganic metal compound being component (d) is used in the form of ultrafine particles having an average particle size of 0.005 to 0.5 μm and a particle size distribution of 0.001 to 1.0 μm.

7. The golf ball material of claim 1, wherein an oxygen-containing inorganic metal compound being component (d) is used in a masterbatch form.

8. The golf ball material of claim 1, wherein an oxygen-containing inorganic metal compound being component (d) used in a masterbatch has an average particle size of from 0.005 to 50 μm and a particle size distribution of from 0.001 to 300 μm.

9. The golf ball material of claim 1, wherein the weight percent of an oxygen-containing inorganic metal compound being component (d) in a masterbatch is from 20 to 80 wt %.

10. The golf ball material of claim 1, wherein thermoplastic component (b) has a weight-average molecular weight Mw in a range of from about 5,200 to 84,000.

* * * * *